United States Patent
Kanskar

(10) Patent No.: US 11,353,650 B2
(45) Date of Patent: Jun. 7, 2022

(54) SINGLE MODE LMA (LARGE MODE AREA) FIBER

(71) Applicant: nLight, Inc., Vancouver, WA (US)

(72) Inventor: Manoj Kanskar, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 16/372,036

(22) Filed: Apr. 1, 2019

(65) Prior Publication Data

US 2019/0302354 A1 Oct. 3, 2019

Related U.S. Application Data

(60) Provisional application No. 62/650,999, filed on Mar. 30, 2018.

(51) Int. Cl.
| | |
|---|---|
| *G02B 6/02* | (2006.01) |
| *G02B 6/028* | (2006.01) |
| *H01S 3/067* | (2006.01) |
| *G02B 6/036* | (2006.01) |
| *G02B 6/10* | (2006.01) |

(52) U.S. Cl.
CPC ......... *G02B 6/02009* (2013.01); *G02B 6/028* (2013.01); *G02B 6/03616* (2013.01); *G02B 6/10* (2013.01); *H01S 3/06708* (2013.01)

(58) Field of Classification Search
CPC .. G02B 6/02009; G02B 6/10; G02B 6/03616; G02B 6/028; H01S 3/06708; H01S 3/0672; H01S 3/08045; H01S 3/06729; H01S 3/06737
See application file for complete search history.

(56) References Cited

U.S. PATENT DOCUMENTS

| | | | | |
|---|---|---|---|---|
| 4,610,506 A | * | 9/1986 | Tokunaga | G02B 6/03611 385/11 |
| 4,726,643 A | * | 2/1988 | Imoto | G02B 6/2835 359/900 |
| 5,719,976 A | * | 2/1998 | Henry | G02B 6/12004 385/28 |
| 9,494,738 B1 | * | 11/2016 | Farmer | G02B 6/2835 |
| 9,590,381 B2 | * | 3/2017 | Hideur | H01S 3/06791 |
| 9,640,936 B1 | * | 5/2017 | Jiang | H01S 3/094007 |
| 9,698,557 B2 | * | 7/2017 | Hosokawa | H01S 3/094069 |
| 2002/0003923 A1 | * | 1/2002 | Ranka | G02B 6/02366 385/28 |
| 2008/0267560 A1 | * | 10/2008 | DiGiovanni | G02B 6/2856 385/28 |
| 2009/0060417 A1 | * | 3/2009 | Bilodeau | G02B 6/14 385/43 |
| 2010/0067860 A1 | * | 3/2010 | Ikeda | H01S 3/0675 385/127 |

(Continued)

FOREIGN PATENT DOCUMENTS

WO  WO-2011048398 A2 * 4/2011 ........... G02B 6/2856

*Primary Examiner* — Ellen E Kim
(74) *Attorney, Agent, or Firm* — Klarquist Sparkman, LLP

(57) ABSTRACT

Large mode area optical fibers include cores that are selected to be smaller than a core size associated with a minimum mode field diameter of a lowest order mode. Cross-sectional shape of such cores can be circular or annular, and a plurality of such cores can be used. Gain regions can be provided in cores or claddings, and selected to produce a selected state of polarization.

24 Claims, 16 Drawing Sheets

(56) References Cited

U.S. PATENT DOCUMENTS

| | | | |
|---|---|---|---|
| 2012/0212802 A1* | 8/2012 | Rothenberg | H01S 3/06754 359/341.1 |
| 2013/0071082 A1* | 3/2013 | Gagnon | G02B 6/024 385/124 |
| 2016/0170138 A1* | 6/2016 | Ishaaya | H01S 3/0672 385/128 |
| 2016/0245989 A1* | 8/2016 | Suzuki | G02B 6/02319 |
| 2016/0304392 A1* | 10/2016 | Bookbinder | C03B 37/01446 |
| 2017/0162999 A1* | 6/2017 | Saracco | H01S 3/06704 |
| 2017/0305781 A1* | 10/2017 | Haruna | C03B 37/01446 |
| 2018/0026415 A1* | 1/2018 | Daniel | H01S 3/0405 372/6 |
| 2019/0052043 A1* | 2/2019 | Jollivet | G02B 6/14 |

* cited by examiner

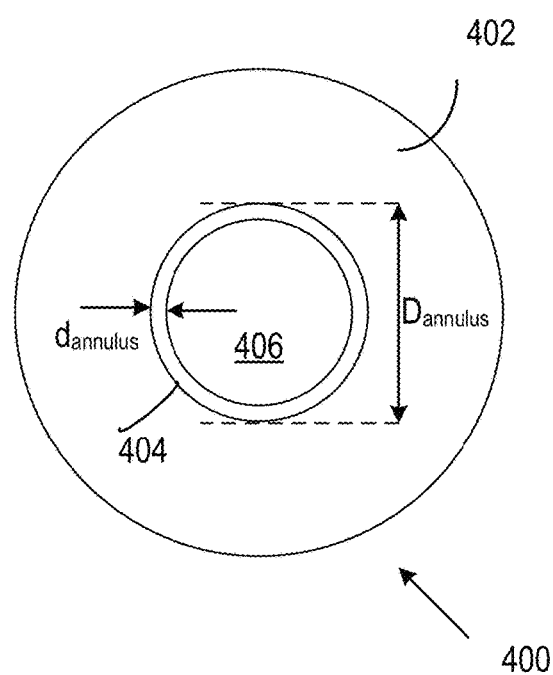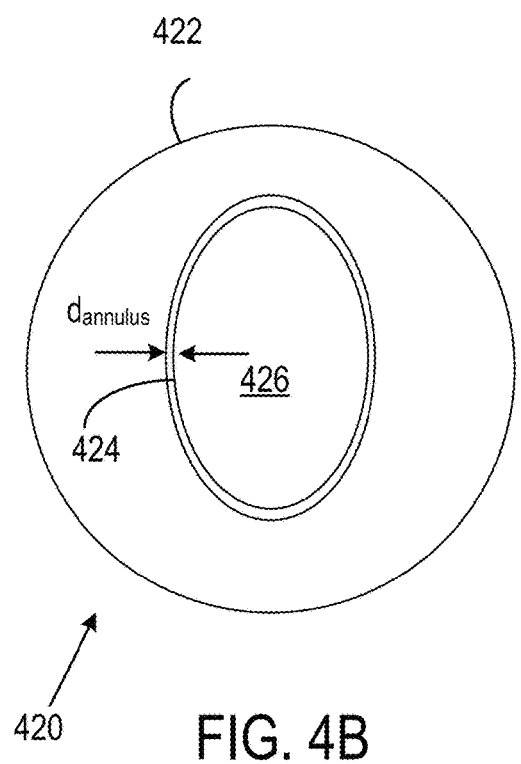

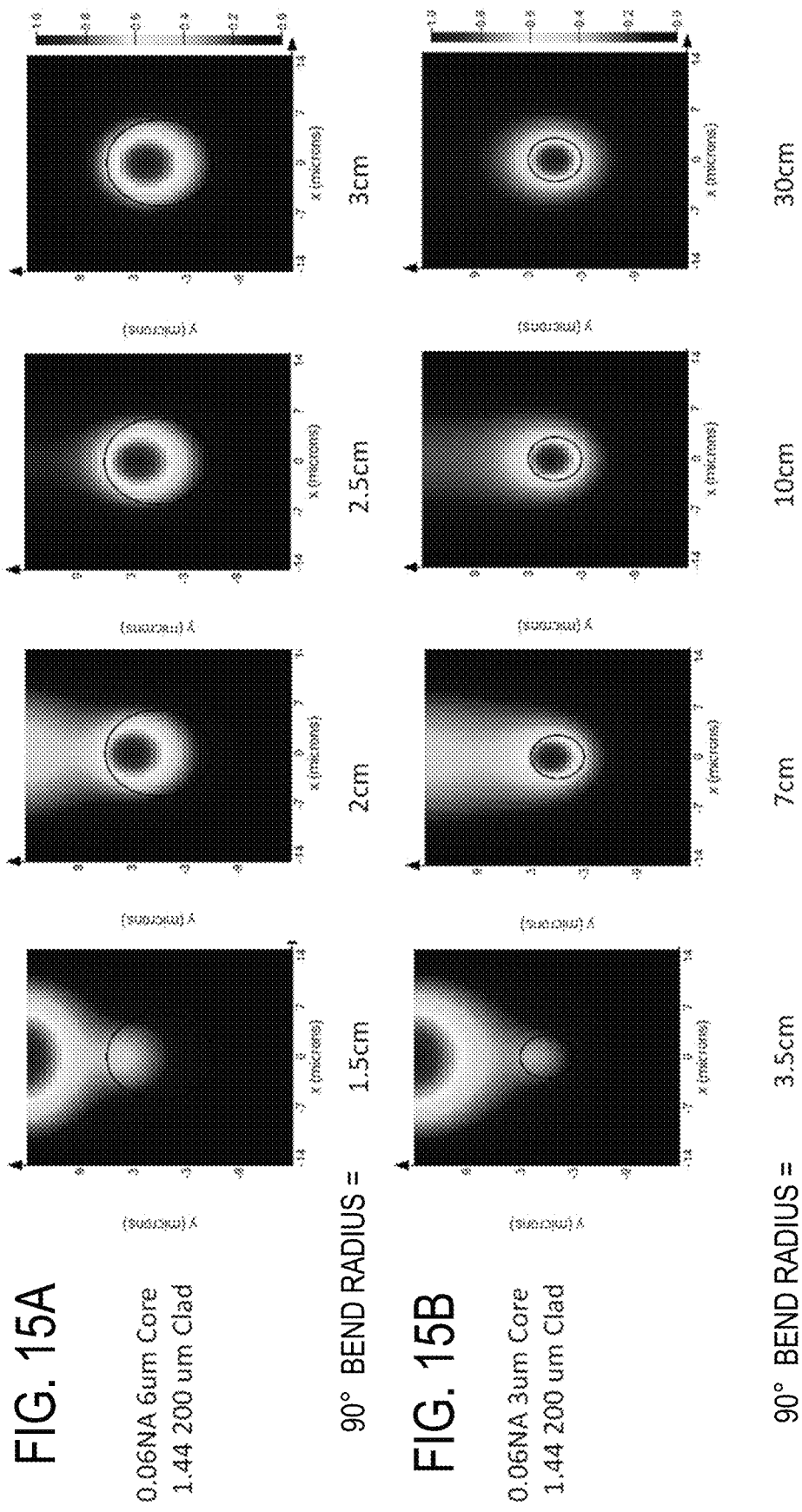

SINGLE MODE LMA (LARGE MODE AREA) FIBER

CROSS REFERENCE TO RELATED APPLICATION

This application claims the benefit of U.S. Provisional Application No. 62/650,999, filed Mar. 30, 2018, which is hereby incorporated by reference in its entirety.

FIELD

The disclosure pertains to large mode area optical fibers.

BACKGROUND

At high powers, purely single mode fibers reach threshold for numerous nonlinear and deleterious effects such as Stimulated Raman Scattering (SRS), Stimulated Brillouin Scattering (SBS), Self-phase Modulation (SPM), Four-wave Mixing (FWM) and Transverse Modal Instability (TMI), to name a few. One of the key reasons for this is the limited effective mode size for single mode fibers, i.e., the cross-sectional area of the fundamental mode is too small for power-scaling without triggering one or more of these effects. Improved large mode area fibers are needed to address these and other limitations of conventional optical fibers.

SUMMARY

Optical fibers comprise a core having a core size that is less than a core size associated with minimum lowest order mode size. A cladding is situated about the core, wherein the core size associated with the minimum lowest order mode size is based on a refractive index difference between the core and the cladding. The core may have a circular cross-sectional area and/or the cladding may include a dopant that is pumpable to provide optical gain. The core may include the dopant and the cladding refractive index may be a function of distance from the core or have a constant value. A cross section of the core may be annular, and the mode size may correspond to the location of the annulus with respect to the axis. The core may also include a plurality of annular cores, wherein widths of each of the annular cores are less than the core size associated with the minimum lowest order mode size. The core may further include a plurality of solid cores, wherein sizes of each of the solid cores are less than the core size associated with the minimum lowest order mode size. The cladding may include a doped region having a circular, elliptical, or polygonal cross-sectional area. The cladding may further include two doped regions oppositely situated with respect to an optical axis of the optical fiber.

Methods comprise selecting a refractive index difference between a core and a cladding and determining a core size associated with a minimum mode size of a lowest order mode based on the selected refractive index difference. For a selected mode size, a core size less than the core size associated with the minimum mode size of the lowest order mode is selected and an optical fiber is fabricated having the selected core size and refractive index difference, The core associated with the selected core size may be an annular core and a plurality of core sizes may be selected, wherein each core size is less than the core size associated with the minimum mode size of the lowest order mode so that the fabricated optical fiber includes a plurality of corresponding cores. The plurality of cores may include a combination of annular and circular cores and at least one of the core and a cladding about the core may include a gain-doped region, wherein the gain doped region has a circular, or polygonal cross-sectional area. The cladding may include two gain-doped regions or multiple gain-doped regions that may be oppositely situated with respect to an optical fiber axis. The gain doped regions may have a common cross-sectional shape. The two or more gain doped regions may be symmetrically situated with respect to an optical fiber axis, and the gain doped regions may have a common cross-sectional shape. The plurality of cores may include a plurality of annular cores. The refractive index and core size may be selected so that the optical fiber has a V-number less than 2.2, 2.0, 1.8, 1.6, or other value less than 2.405. The refractive index and core size may be selected so that the optical fiber may have a V-number between 1.2 and 2.2.

Optical waveguides comprise waveguide channels having an effective size that is less that a size associated with a minimum mode size of a lowest order mode. A cladding is optically coupled to at least a portion of the waveguide channel.

These and other features are described below with reference to the accompanying drawings.

BRIEF DESCRIPTION OF THE DRAWINGS

FIGS. 4A-4B illustrate large mode area optical fibers having annular cores.

FIGS. 15A-15B illustrate simulated power distributions in 0.06 numerical aperture (NA) fibers having a cladding diameter of 200 μm and a 6 μm core and a 3 μm core, respectively, at various 90 degree bend radii. Cladding refractive index is 1.44.

DETAILED DESCRIPTION

As used herein, core size of optical fibers generally refers to an effective size of a fiber core. In some cases, such as in cylindrically symmetric optical fibers, core size corresponds to core diameter or core radius. In examples in which an optical fiber is not cylindrically symmetric, effective core size is a function of core dimensions along two or more directions.

The examples discussed below are based on optical fibers, but other optical waveguides such as those defined in silica, glass, polymers or other substrates can be similarly configured to provide single mode propagation with large mode size. Optical fiber cross-sections as described herein are cross-sections in a plane perpendicular to an axis of propagation in the optical fiber.

In the disclosed examples, single-mode fibers are described having surprisingly small core sizes. It will be appreciated that optical fibers that are single mode at a design wavelength can allow propagation of multiple modes at shorter wavelengths. For the purposes of this disclosure, optical fiber characteristics are generally specified at a design wavelength, and single mode fibers at a design wavelength need not be single mode at shorter wavelengths. In most practical examples, design wavelengths are between about 400 nm and 2.0 μm, and typically between about 800 nm and 1.6 μm.

In some examples, fiber cores have circular, polygonal, or other cross-sectional shapes. Such cores are referred to herein as solid cores. In other examples, fiber cores are annular and include a central non-core portion that typically has a refractive index corresponding to a cladding. As used herein, an annular core can be defined by a polygonal, arcuate, elliptical, circular or other shape or combination of shapes and an annulus width which can be constant or variable.

Figure 1A:
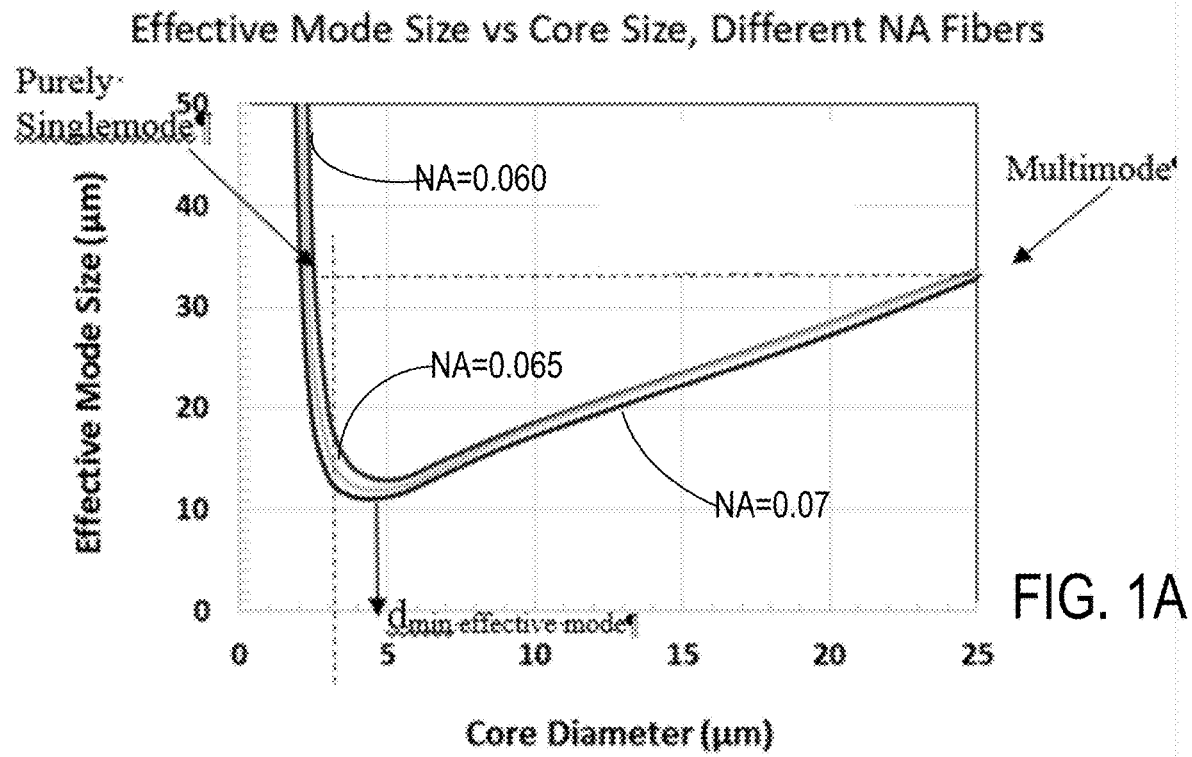
FIG. 1A contains plots of optical fiber mode area as a function of fiber core diameter for numerical apertures (NAs) of 0.06, 0.065, and 0.07.
Figure 1B:
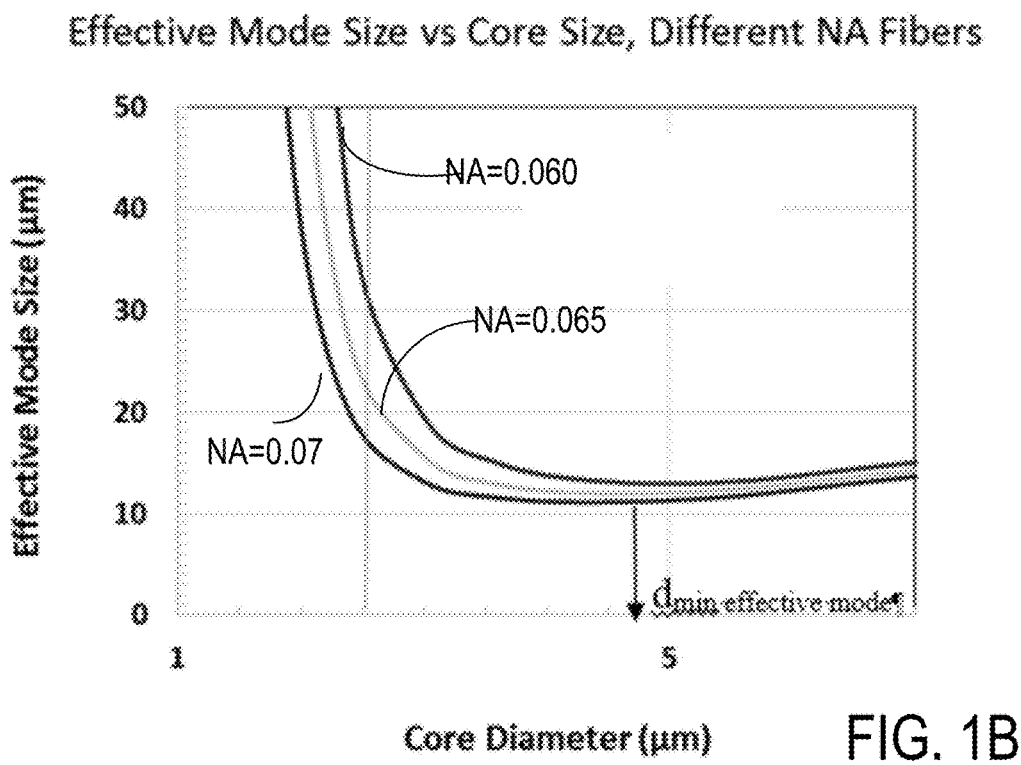
FIG. 1B is an expanded view of a portion of FIG. 1A.

Surprisingly (and contrary to conventional approaches), single mode propagation with large mode field diameters can be provided in optical fibers by reducing core size. Typically, core size is reduced to be smaller than a core size $d_{min}$ that is associated with a minimum effective mode diameter of a lowest order mode. Reducing core size below $d_{min}$ increases mode size. This is illustrated in the simulation results shown in FIGS. 1A-1B. FIG. 1A illustrates effective mode size as a function of core diameter for optical fibers having a cladding index of refraction of 1.440 and three different numerical apertures (NAs) for the core. NA is generally related to the shape of the fiber RIP, and associated with a ratio of a design wavelength λ to mode size. FIGS. 1A-1B illustrate a representative example and even higher NAs can provide superior performance. Minimum effective mode size as a function of core size varies slightly for different NAs. At core sizes larger than the core size associated with a minimum effective mode size (e.g., core diameter $d_{core} > d_{min}$), effective mode size increases approximately linearly as core size is increased. In the example of FIG. 1A, optical fibers having core sizes greater than about 6 μm support higher order mode propagation and are thus multimode at these core sizes. However, for core sizes less than $d_{min}$, effective mode sizes are large while the optical fiber remains purely single mode. As shown in FIG. 1A, effective mode size increases rapidly as a function of core diameter as core diameter is reduced from $d_{min}$. Therefore, for optical fibers having core sizes $d_{core} < d_{min}$ the effective mode size can be larger than that obtained with core sizes that permit multimode propagation. For example, in FIG. 1A, a fiber having a core size of approximately 2.5 μm and a 0.07 NA has the same effective mode size as that of a 25 μm core fiber; however, the 2.5 μm core diameter fiber remains single mode while the 25 μm core fiber permits multimode propagation. To obtain single-mode only propagation and increase mode size, an optical fiber mode diameter can be selected by selecting a core size such that $d_{core} < d_{min}$ for a selected core NA and cladding index of refraction. In this way, the fiber is constrained to be single mode and not support higher order modes, and provide a large mode area.

Mode size, including minimum mode size, can be estimated for step-index, single-mode fibers having a core refractive index $n_1$ and a cladding refractive index $n_2$ using Marcuse's equation. For a fiber of core radius $\alpha=d/2$ and V-number V, a ratio of mode field radius w to core radius $\alpha$ can be estimated as:

$$\frac{w}{a} = 0.65 + 1.619 \Big/ V^{\frac{3}{2}} + 2.879/V^6,$$

wherein $V=2\pi\alpha NA/\lambda^2$, numerical aperture $NA=\sqrt{n_1^2-n_2^2}$, and λ is free space wavelength of radiation propagated by the fiber, typically about 1 μm for erbium, neodymium, and ytterbium dopings, although other wavelengths can be available. V-numbers of less than 2.405 (referred to herein as $V_{SM}$) are associated with single mode fibers. In the examples disclosed herein, fiber parameters are selected to produce fibers having V-numbers that are less than 0.5, 0.6, 0.7, 0.8, or 0.9 times $V_{SM}$. In most examples, V-numbers range from about 0.5 to about 0.9 times $V_{SM}$, or other more limited ranges within this range. In some cases, associated core radii are selected to provide control of single mode propagation even in fibers subjected to 90 degrees bends of radii between 2.5 cm and 30 cm.

Figure 2A:
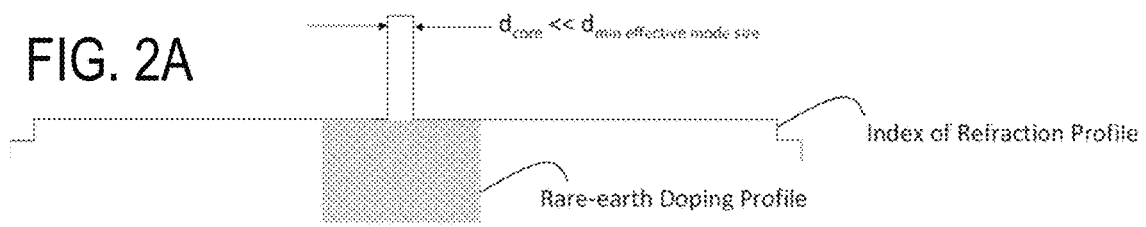
FIGS. 2A-2Q illustrate refractive index profiles (RIPs) of single mode optical fibers having small core sizes that propagate single modes with large mode sizes and that include doping to provide optical gain. In some examples, the doping that provides gain also produces an index of refraction difference defining a core region.
Figure 2B:
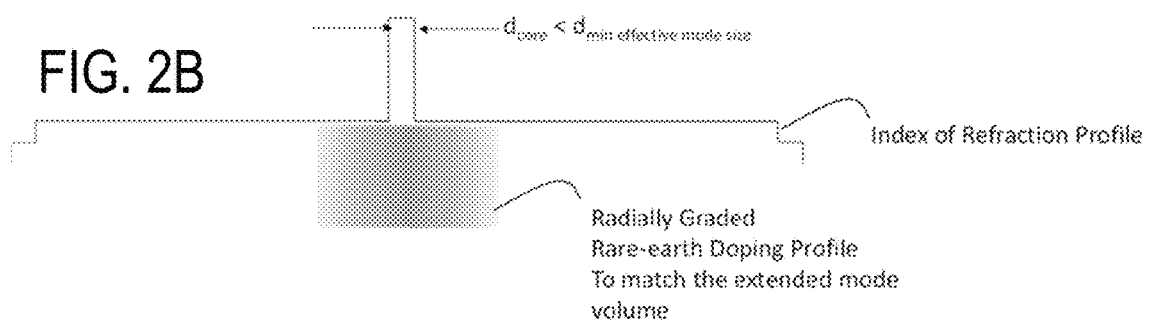
Figure 2C:
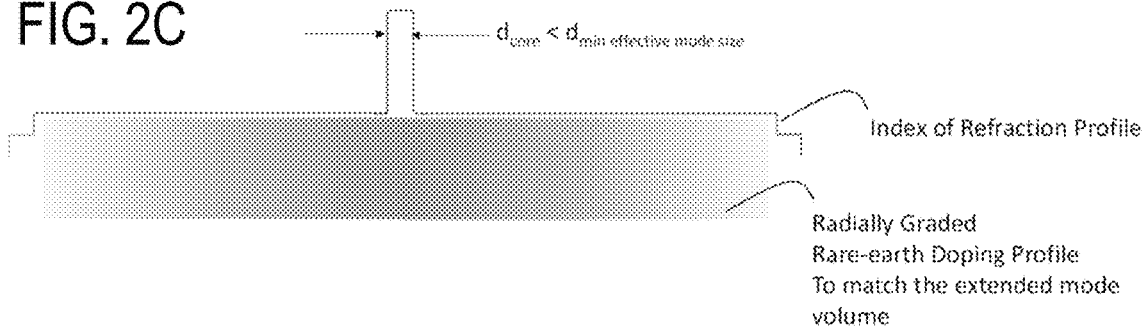
Figure 2D:
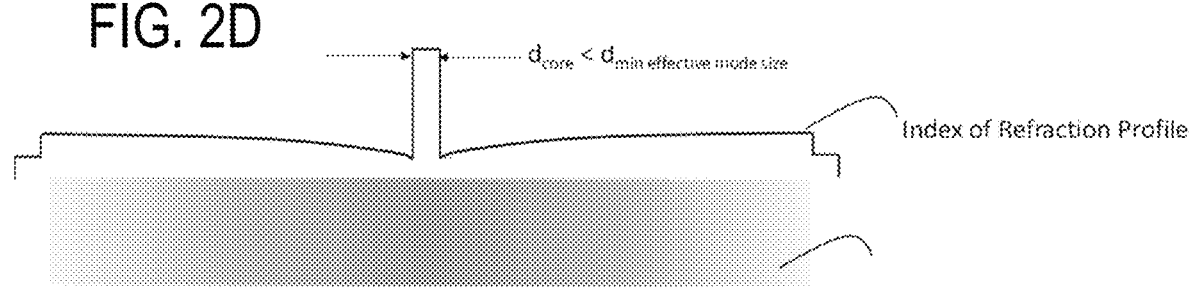
Figure 2E:
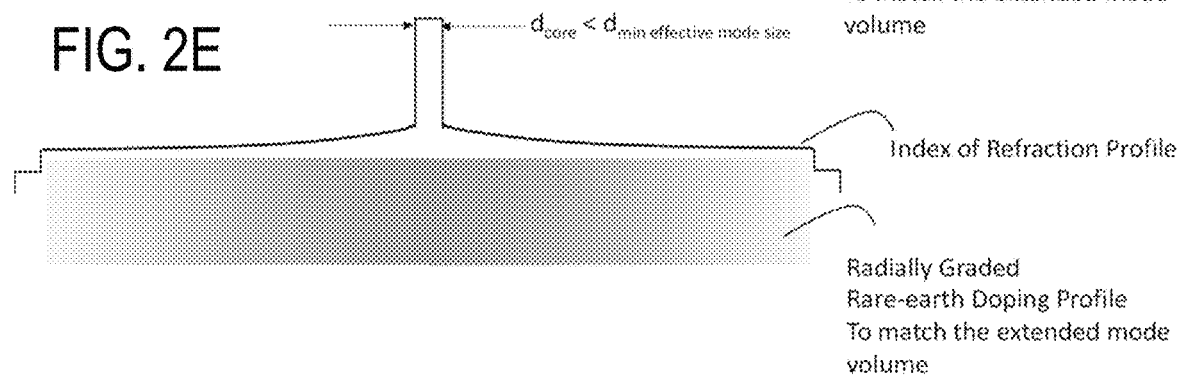
Figure 2F:
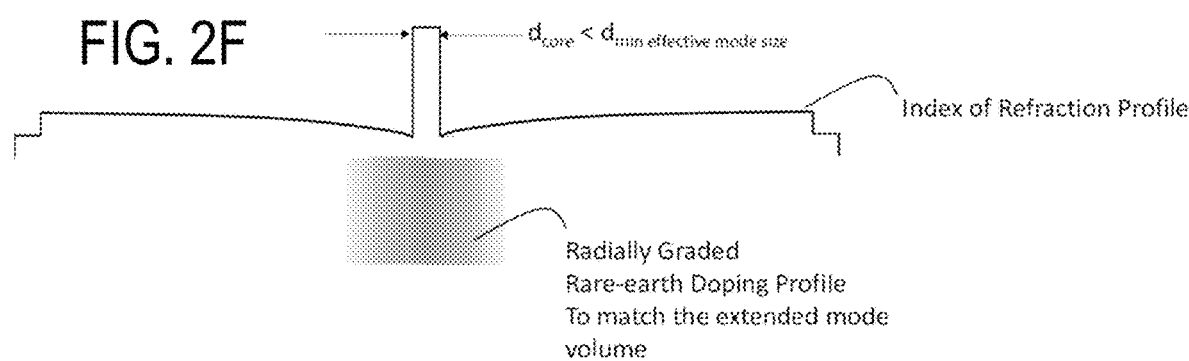
Figure 2G:
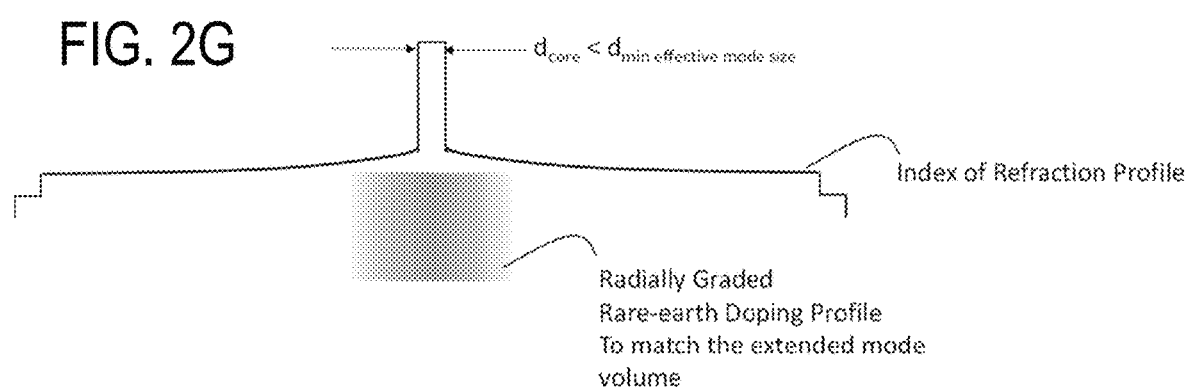
Figure 2H:
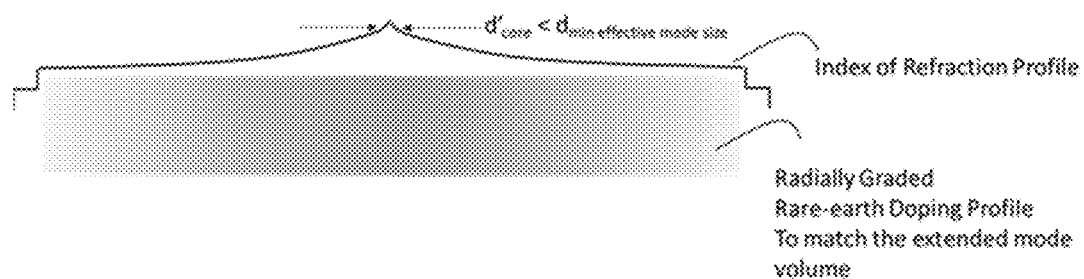
Figure 2I:
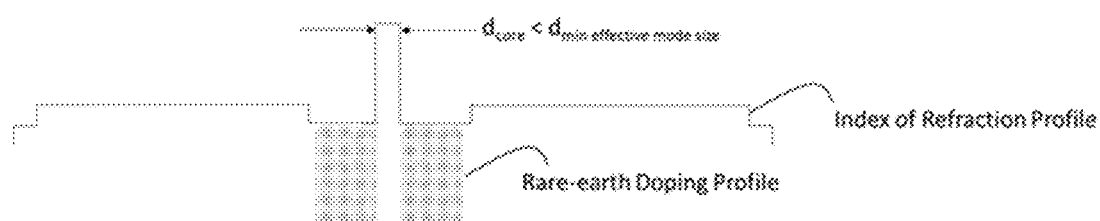
Figure 2J:
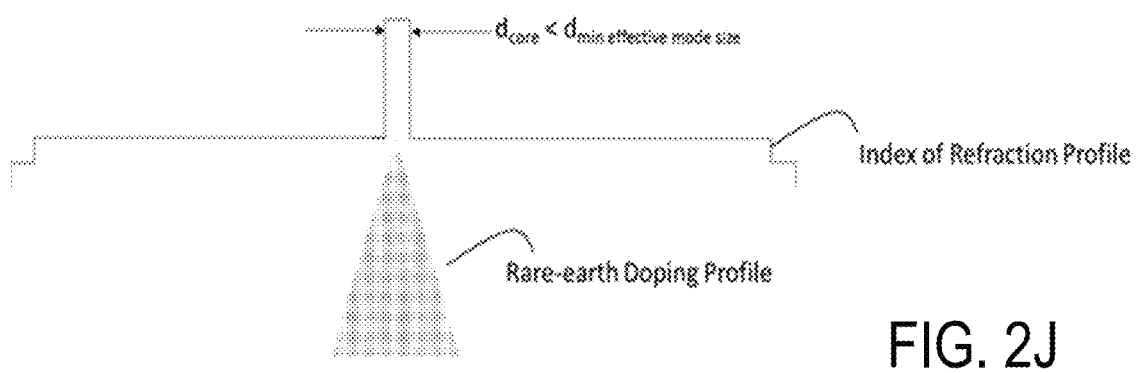
Figure 2K:
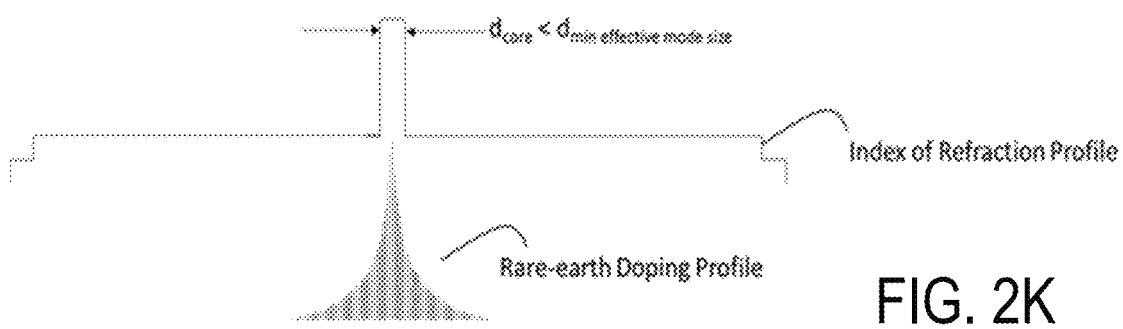
Figure 2L:
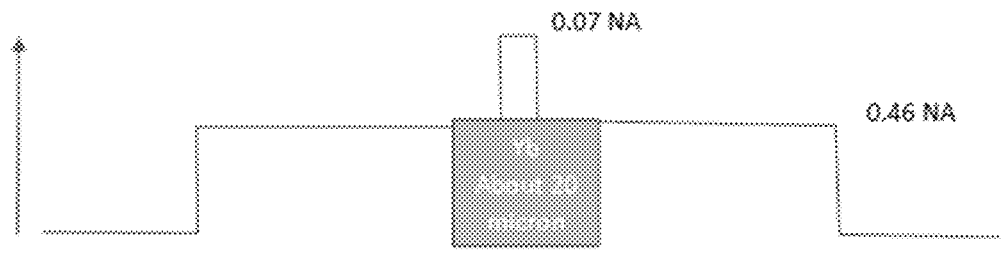
Figure 2M:
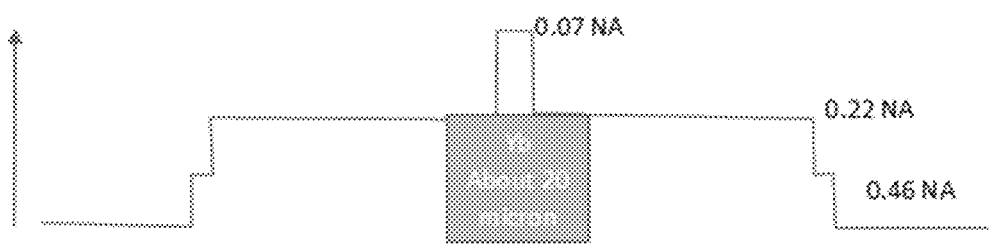
Figure 2N:
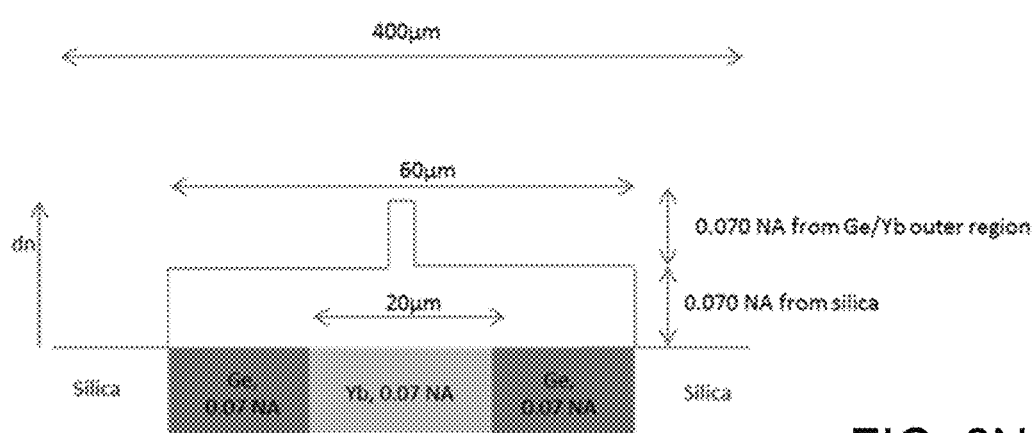
Figure 2O:
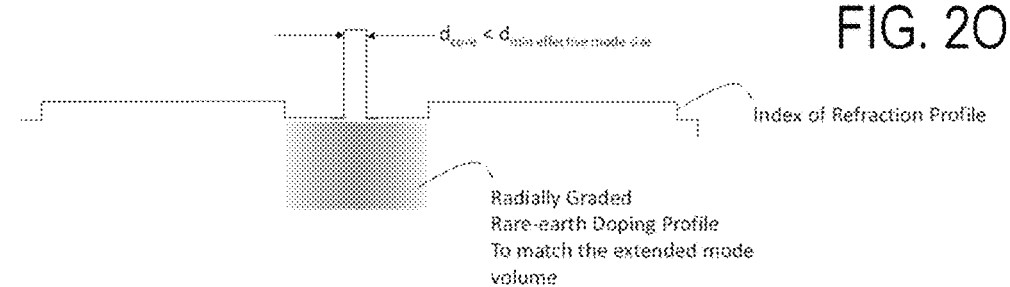
Figure 2P:
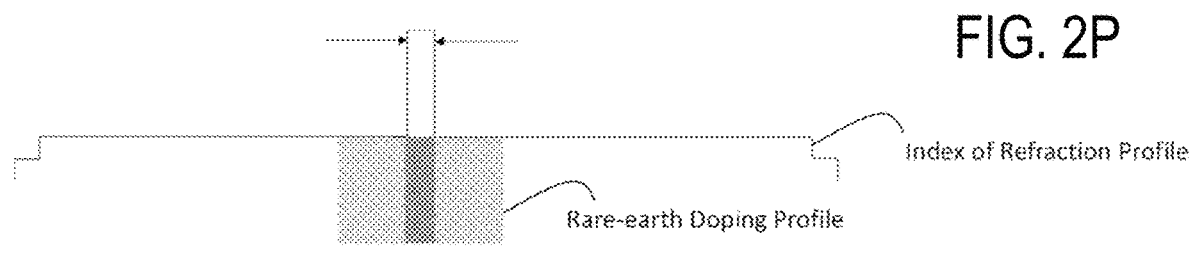
Figure 2Q:
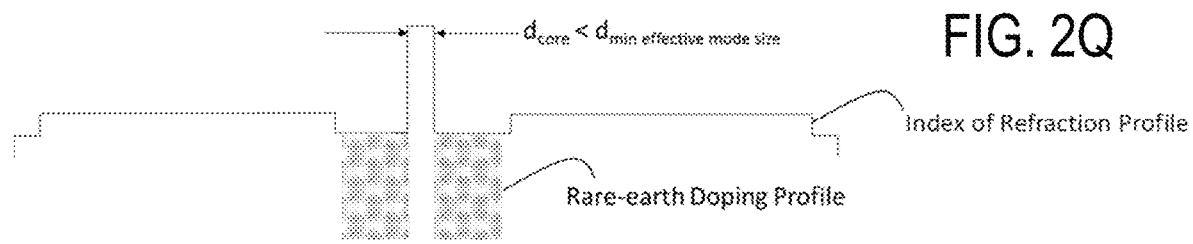

In fibers that are to provide optical gain, gain can be tailored independently of mode area to provide a preferred efficiency, PER, threshold etc. Some examples of gain tailored optical fibers are shown in FIGS. 2A-2N and include single clad, double clad, and triple clad designs. While examples are shown as step index optical fibers, a fiber core or cladding need not have a constant refractive index and a core (and/or cladding) refractive index profile (RIP) can be any function as long as $d_{core} < d_{min}$ to obtain large mode area, single mode propagation. For example, a multi-step RIP or parabolic RIP or other arbitrary RIP can be used. As shown, multi-clad fibers can be configured in this was so long as $d_{core} < d_{min}$. Fiber cross-sectional gain-profile can be any arbitrary size and shape as preferred to obtain a selected efficiency, polarization extinction ratio, and/or threshold. For example, the fiber core can be elliptical, polygonal, or other shape so long as an effective $d_{core} < d_{min}$.

Figure 3A:
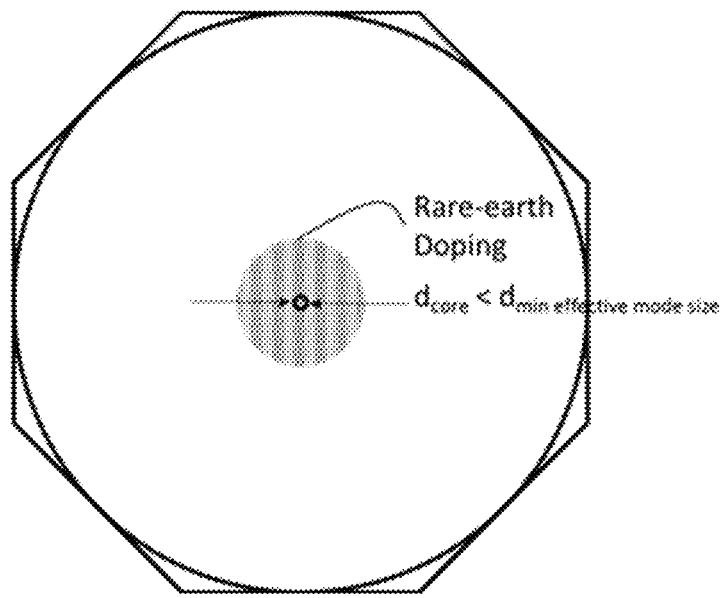
FIGS. 3A-3D illustrate representative single mode optical fibers having small core sizes that propagate single modes having large mode sizes and that include symmetric and asymmetric gain regions.
Figure 3B:
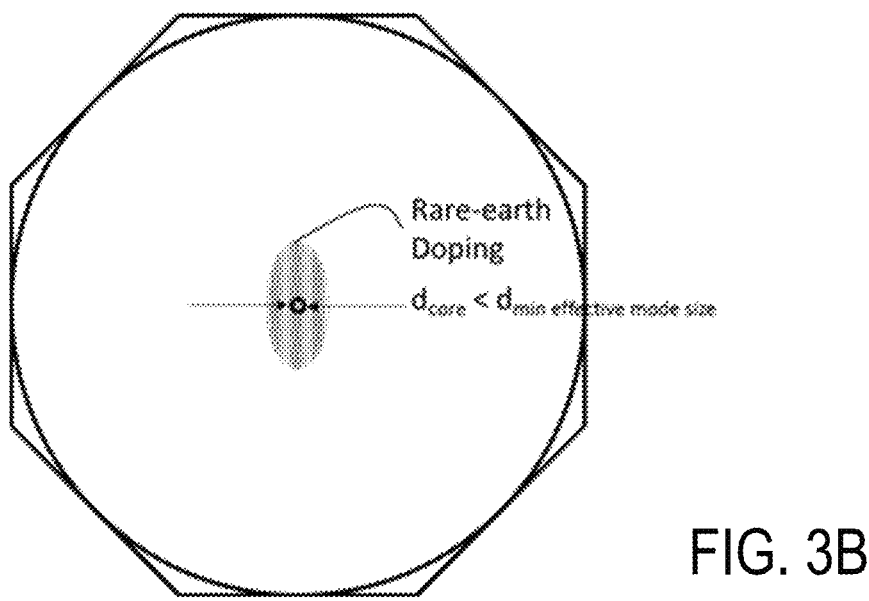
Figure 3C:
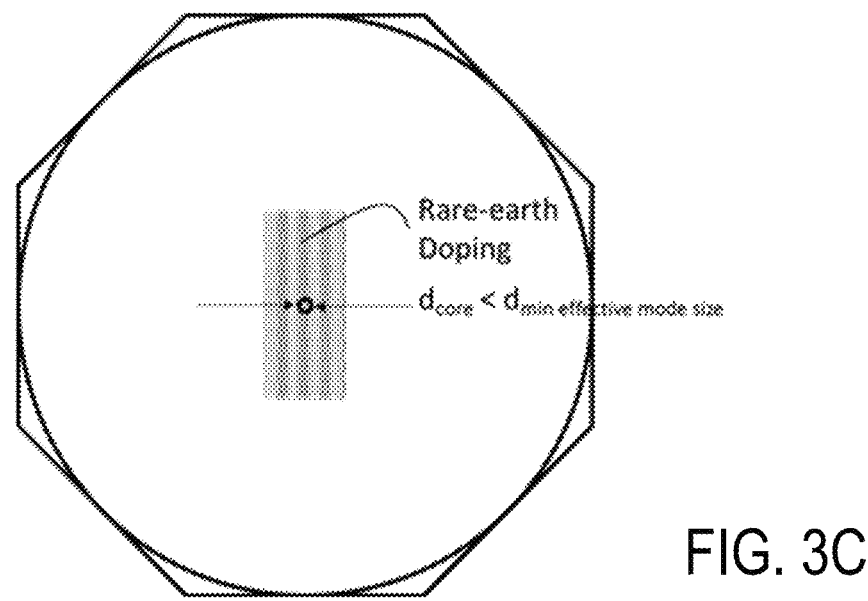
Figure 3D:
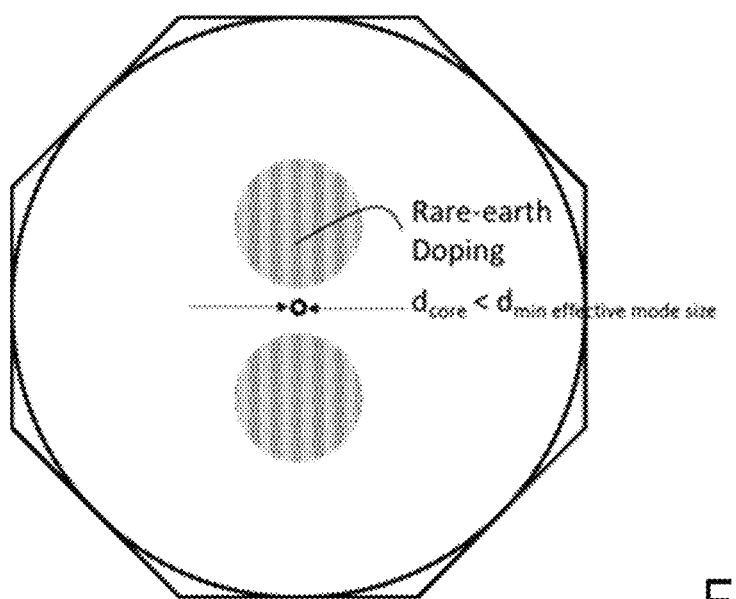

FIGS. 3A-3D show representative examples of representative lateral cross-sectional gain and refractive index profiles. In order to maintain single mode operation, a rare-earth doped gain region preferably has a lower refractive index or equal refractive index than that of a cladding. In the examples of FIGS. 3A-3D, optical fiber designs are shown that can provide single-mode only operation. A variety of gain regions are illustrated, and a rare-earth doped cross-section can be as illustrated or otherwise selected to correspond to or other be based on FWHM, 1/e², or any percent of cross-sectional area occupied by the mode field. Optical fibers that use high index core sizes such that $d_{core} < d_{min}$ are not limited to circular cross-sections, and optical fiber cross section can be polygonal with acute (star shape) or obtuse (e.g. octagonal) angles. In some examples such as shown in FIG. 3D, gain tailoring can be used to control polarization instead of conventional index tailoring using stress rods.

In other examples, a core can be provided as an annulus as shown in FIGS. 4A-4B. Respective fibers 400, 420 have cross-sections defined by respective claddings 402, 422, annuli 404, 424, and central regions 406, 426. As long as a width of the annulus $d_{annulus}$ is less than $d_{min}$, single-mode only propagation is obtained. In one example, a single mode fiber has a 2 μm wide annulus with outer diameters of 6 and 8 μm, with an effective refractive index contrast of the annulus to the cladding equivalent to NA=0.076. Annulus width can be constant or variable, and an annulus can be polygonal, circular, elliptical, or other shapes defined by arcs and line segments or a combination thereof. Multiple annuli can be combined with circular cores as well. Referring to FIG. 4A, providing an annular width $d_{annulus}<d_{min}$ with an annulus of diameter $D_{annulus}$ permits single mode operation with a mode field diameter/area that is at least as large as $D_{annulus}$.

FIGS. 5-11 illustrate additional representative examples. In these figures, relative output beam power is shown in two dimensions with color coding at a fiber exit face; arrangements of cores and annuli as discussed below are shown in central portions of these figures.

Figure 5:
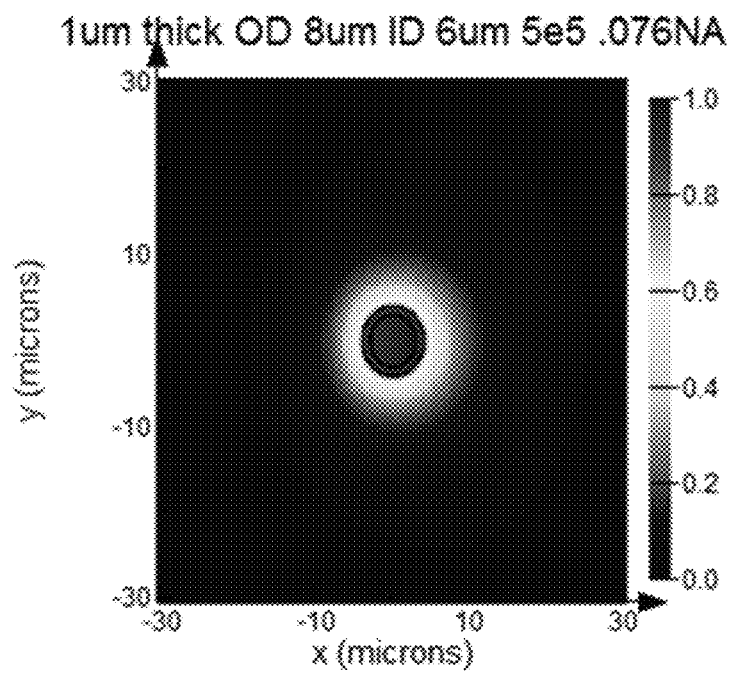
FIGS. 5-11 illustrate relative beam power distributions provided by optical fibers with additional representative example RIPs.
Figure 6:
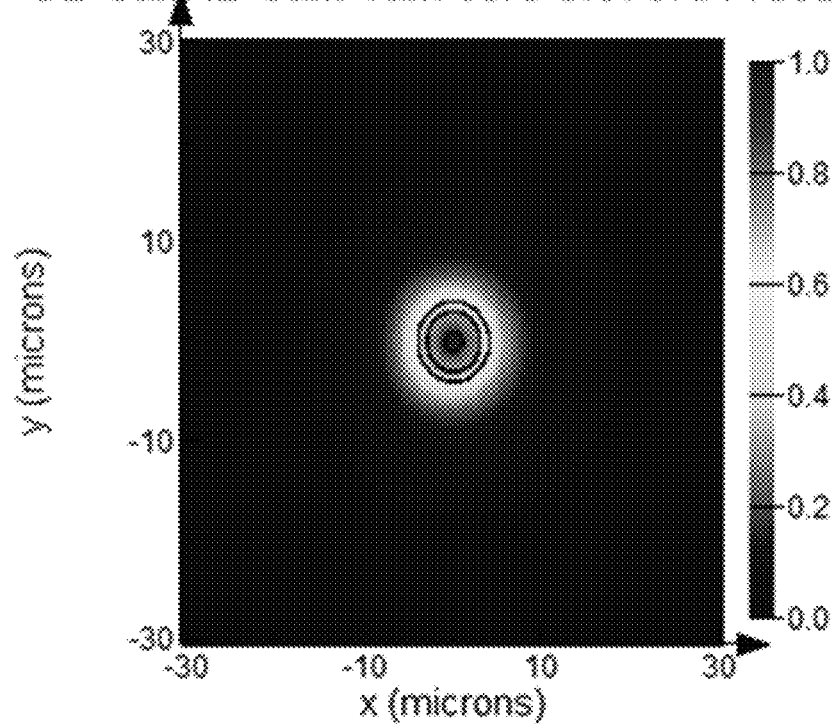

An optical fiber having a core size $d_{core}<d_{min}$ and an annulus is shown in FIG. 5. In another example shown in FIG. 6, an optical fiber has a 1 μm diameter core (i.e., core size $d_{core}<d_{min}$) and an annulus with 6 μm and 8 μm inner and outer diameters respectively. The core size $d_{core}<d_{min}$ and the annulus width $d_{annulus}<d_{min}$ and the core and annulus can be spaced arbitrarily.

Figure 7:
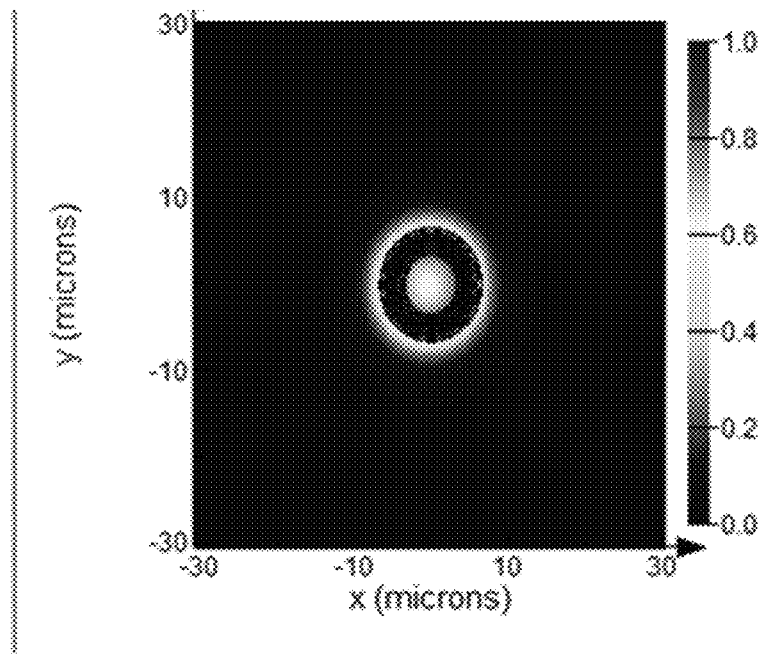
Figure 8:
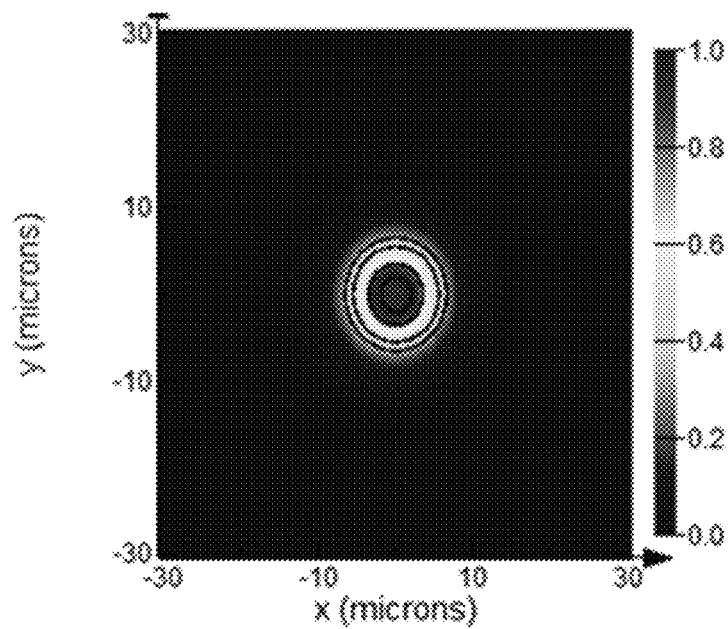

As shown in FIGS. 7-8, multiple annuli can be used, wherein for each annulus $d_{annulus}<d_{min}$. Spacing between each of the annuli can be arbitrary.

Figure 9:
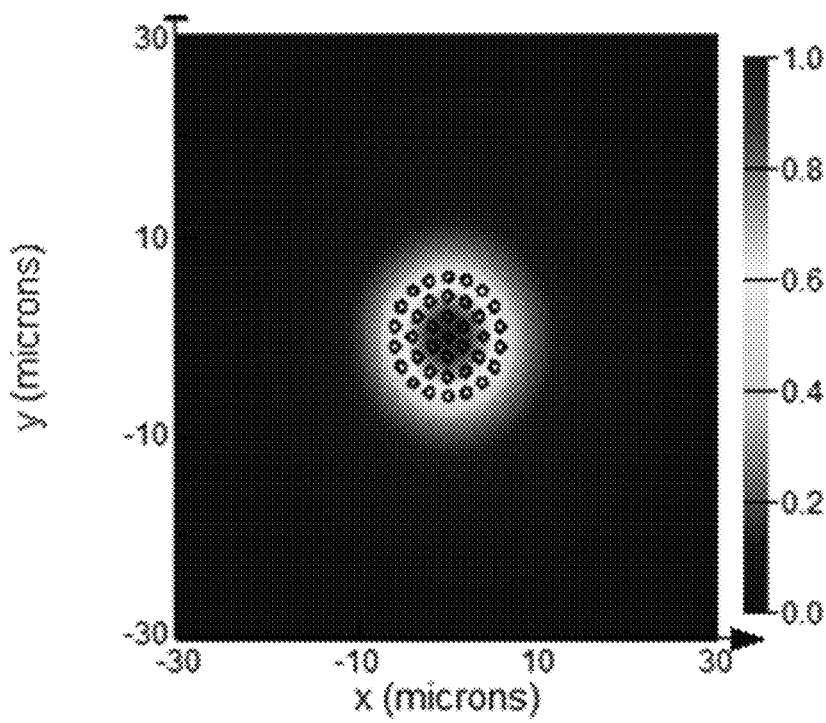
Figure 10:
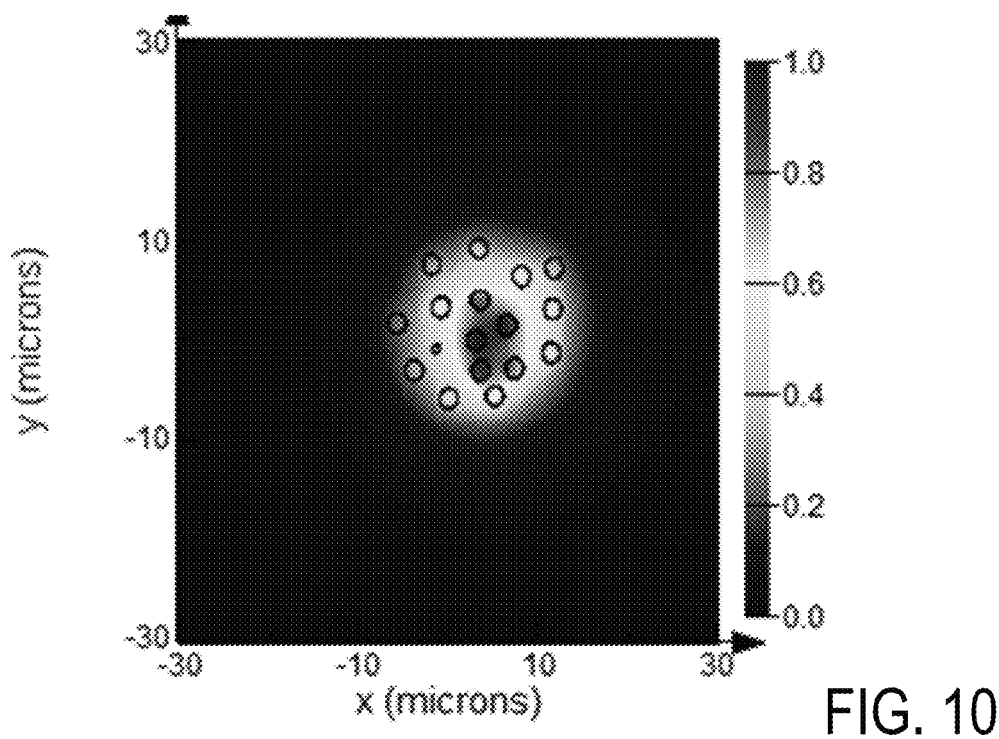

As shown in FIG. 9, multiple cores having $d_{core}<d_{min}$ can be arranged to avoid formation of a photonic bandgap or a leaky mode structure, i.e., in a non-resonant condition for an intended wavelength range. Alternatively, a random arrangement as shown in FIG. 10 can be used.

Figure 11:
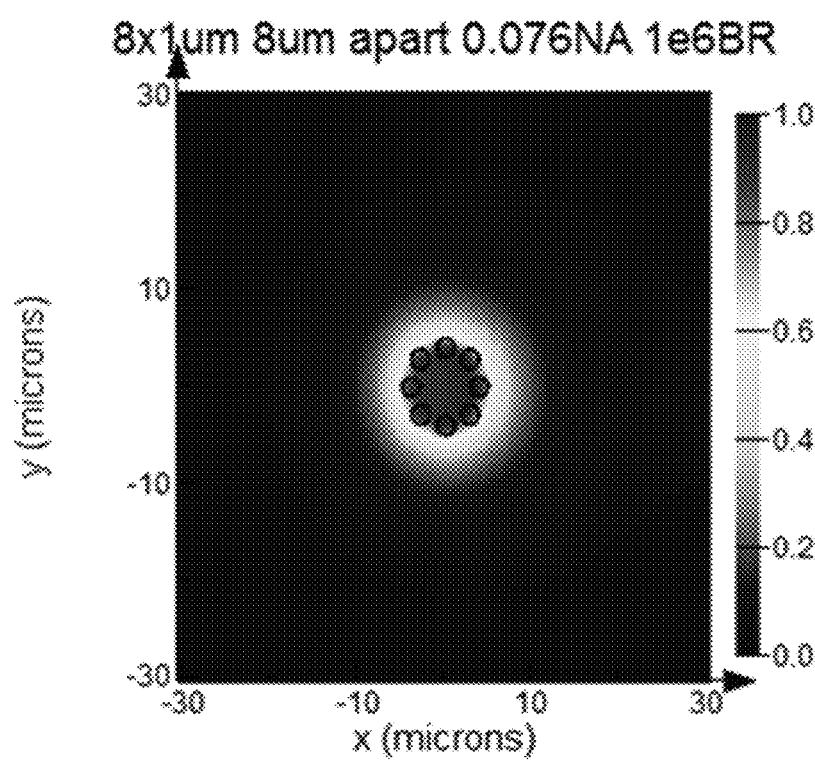

As shown in FIG. 11, an optical fiber can have a ring of cores whereby $d_{core}<d_{min}$. The locations of these cores can be at any fixed radii from the center of an optical axis. In addition, a core of core size $d_{core}<d_{min}$ can be surrounded by a ring of these cores as well.

Figure 12:
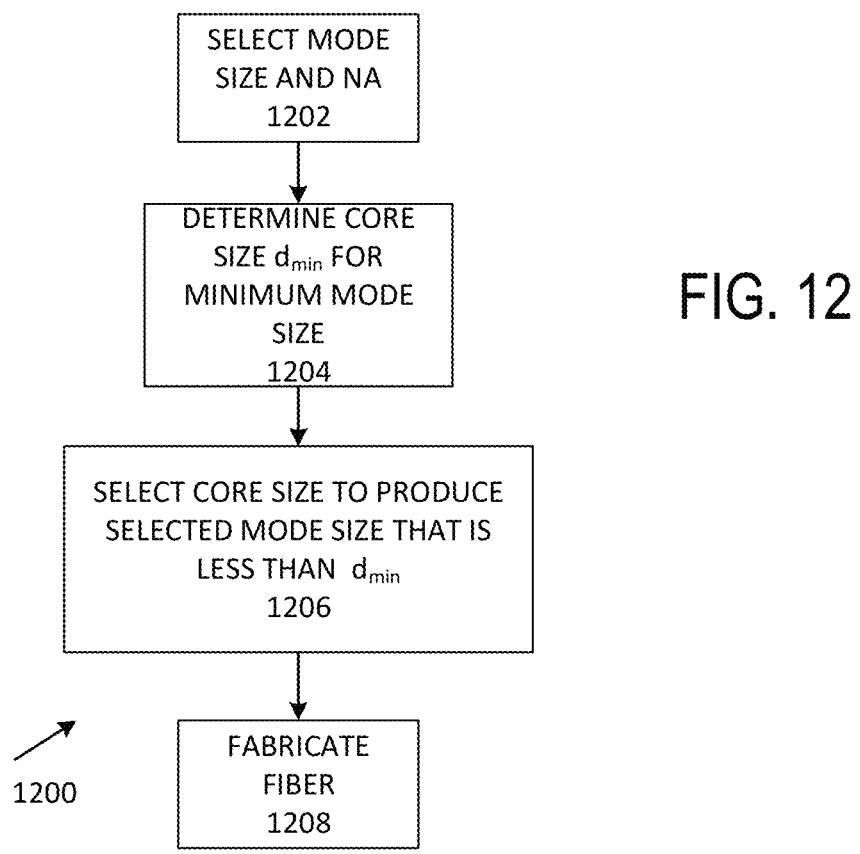
FIG. 12 illustrates a method of making a single mode, large mode area optical fiber.

Referring to FIG. 12, a representative method 1200 includes selecting fiber mode size and numerical aperture at 1202. At 1204, a core size associated with a minimum mode size is estimated or otherwise determined, and at 1206, a core size is selected that produces the selected mode size and that is less than the core size associated with the minimum mode size. At 1208, an optical fiber associated with the selected mode size is produced based on the selected core size and numerical aperture.

Figure 13:
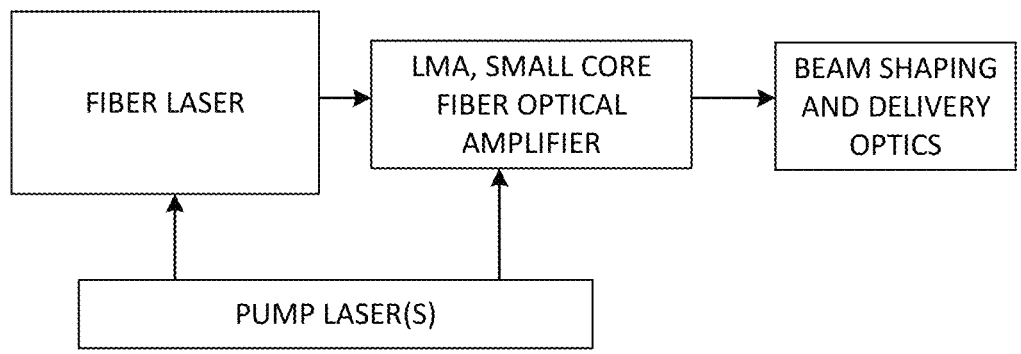
FIGS. 13-14 illustrate representative fiber laser systems that include large mode area (LMA), small core single mode fibers.
Figure 14:
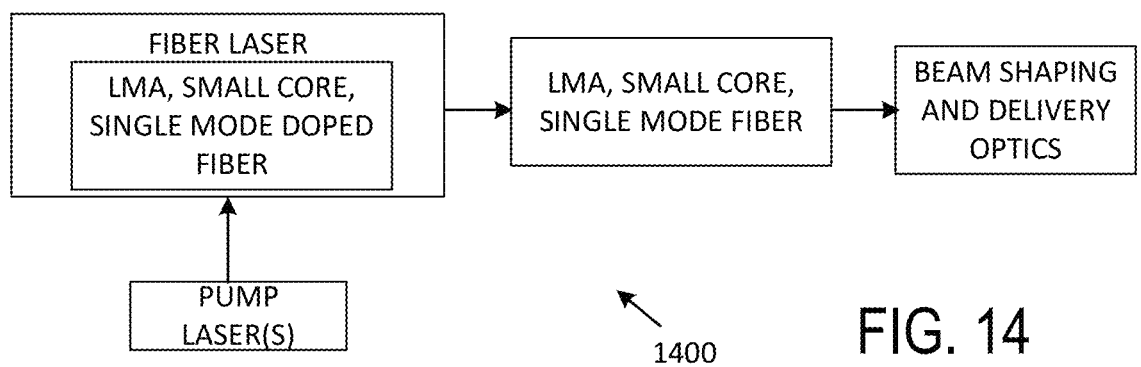

With reference to FIG. 13, a fiber laser system 1300 includes a fiber amplifier based on an LMA, small core single mode optical fiber as described above. In another example shown in FIG. 14, a fiber laser system 1400 uses such a fiber is used to provide gain for a fiber laser and an undoped fiber LMA single mode fiber is used to deliver an optical beam to beam shaping optics for delivery to a workpiece or other application. In these examples, undesirable effects associated with small mode sizes at high optical powers tend to be eliminated or reduced.

FIGS. 15A-15B illustrate simulated power distributions in 0.06 numerical aperture (NA) fibers having a cladding diameter of 200 μm and a 6 μm core and a 3 μm core, respectively, at various 90 degree bend radii. Cladding refractive index is 1.44. As shown in FIGS. 15A-15B, such fibers can exhibit large deviations of a single mode in response to bending, but bend radii of about 2.5 cm and 10 cm are associated with small bending effects.

In view of the many possible embodiments to which the principles of the disclosed technology may be applied, it should be recognized that the illustrated embodiments are only preferred examples and should not be taken as limiting.

I claim:

1. A single mode optical fiber, comprising:
    a core having a constant effective core diameter d and a refractive index $n_{core}$; and
    a cladding situated about the core and having a refractive index $n_{clad}$, wherein $n_{core}$ and $n_{clad}$ are selected such that a V-number $$V = \frac{2\pi a \sqrt{n_{core}^2 - n_{clad}^2}}{\lambda}$$

is between 1.2 and 2.2, α=d/2 and an effective mode diameter is greater than the effective core diameter d, and wherein the core and the cladding include a dopant that is pumpable to provide optical gain.

2. The optical fiber of claim 1, wherein the core has a circular cross-sectional area.

3. The optical fiber of claim 1, wherein the cladding refractive index is not a constant.

4. The optical fiber of claim 1, wherein the cladding refractive index is constant.

5. The optical fiber of claim 1, wherein a cross section of the core is annular, and the effective mode diameter corresponds to the location of the annulus with respect to the axis.

6. The optical fiber of claim 1, wherein the core includes a plurality of annular cores, wherein widths of each of the annular cores are less than the effective core diameter associated with a minimum lowest order mode diameter.

7. The optical fiber of claim 1, wherein the core includes a plurality of solid cores, wherein diameters of each of the solid cores are less than the effective core diameter associated with a minimum lowest order mode diameter.

8. The optical fiber of claim 1, wherein the cladding includes a doped region having a circular, elliptical, or polygonal cross-sectional area.

9. A single mode optical fiber, comprising:
    a core having an effective core diameter d and a refractive index $n_{core}$; and
    a cladding situated about the core and having a refractive index $n_{clad}$, wherein $n_{core}$ and $n_{clad}$ are selected such that a V-number $$V = \frac{2\pi a \sqrt{n_{core}^2 - n_{clad}^2}}{\lambda}$$

is between 1.2 and 2.2, α=d/2, an effective mode diameter is greater than the effective core diameter d, and the cladding includes two doped regions oppositely situated with respect to an optical axis of the optical fiber.

10. A method of making a single mode fiber, comprising:
    selecting a refractive index difference Δn between a core and a cladding of the single mode optical fiber;
    determining a minimum mode diameter for the refractive index difference Δn;
    determining a core size for the minimum mode diameter;
    selecting a mode diameter;
    selecting a core diameter associated with the selected mode diameter, wherein the selected core diameter is less than the core diameter associated with the minimum mode diameter; and fabricating the single mode fiber to have the selected core diameter, the selected refractive index difference Δn, and the selected mode diameter, and a V-number $$V = \frac{2\pi a \sqrt{n_{core}^2 - n_{clad}^2}}{\lambda}$$

that is less than 2.2, 2.0, 1.8, or 1.6, wherein α is a core radius.

11. The method of claim 10, wherein the core associated with the selected core diameter is an annular core.

12. The method of claim 10, further comprising selecting a plurality of core diameters, each core size less than the core diameter associated with the minimum mode diameter of the lowest order mode so that the fabricated optical fiber includes a plurality of corresponding cores.

13. The method of claim 12, wherein the plurality of cores includes a combination of annular and circular cores.

14. The method of claim 10, wherein a cladding about the core includes a gain-doped region, wherein the gain doped region has a circular or polygonal cross-sectional area.

15. The method of claim 14, wherein the cladding includes two gain-doped regions or multiple gain-doped regions.

16. The method of claim 15, wherein the two gain doped regions are oppositely situated with respect to an optical fiber axis, and the gain doped regions have a common cross-sectional shape.

17. The method of claim 15, wherein the two or more gain doped regions are symmetrically situated with respect to an optical fiber axis, and the gain doped regions have a common cross-sectional shape.

18. The method of claim 12, wherein the plurality of cores includes a plurality of annular cores.

19. The method of claim 10, wherein the refractive index and core diameter are selected so that the optical fiber has a V-number that is less than 2.

20. A single mode fiber made by the method of claim 10.

21. A single mode fiber, comprising:
a core having a core diameter d; and
a cladding situated about the core, the core and the cladding having a refractive index difference Δn and defining a V-number $$V = \frac{2\pi a \sqrt{n_{core}^2 - n_{clad}^2}}{\lambda}$$

that is less than 2, wherein α=d/2 and the core and the cladding include a dopant that is pumpable to provide optical gain.

22. A single mode optical fiber, comprising:
a core having a core diameter that is less than a core diameter associated with a minimum lowest order mode size associated with a core diameter at which a first derivative of mode diameter with respect to core diameter is zero; and
a cladding situated about the core, where the core diameter associated with the minimum lowest order mode size is based on a refractive index difference between the core and the cladding, wherein the core and the cladding include a dopant that is pumpable to provide optical gain.

23. The single mode fiber of claim 21, wherein the core diameter is constant.

24. The single mode fiber of claim 22, wherein the core diameter is constant.

* * * * *